US009100146B2

(12) United States Patent
Lee et al.

(10) Patent No.: US 9,100,146 B2
(45) Date of Patent: Aug. 4, 2015

(54) VIRTUAL SECTORIZATION USING AN ACTIVE ANNTENNA ARRAY

(75) Inventors: Jung Ah Lee, Pittstown, NJ (US); Philippe Sehier, St. Germain en Laye (FR); Jean-Pierre Balech, Antony (FR); Fang-Chen Cheng, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 554 days.

(21) Appl. No.: 13/415,142

(22) Filed: Mar. 8, 2012

(65) Prior Publication Data

US 2013/0235807 A1  Sep. 12, 2013

(51) Int. Cl.
| H04B 7/06 | (2006.01) |
| H04W 36/06 | (2009.01) |
| H04L 1/00 | (2006.01) |
| H04W 16/28 | (2009.01) |
| H01Q 1/24 | (2006.01) |
| H04W 72/12 | (2009.01) |

(52) U.S. Cl.
CPC .............. *H04L 1/0026* (2013.01); *H01Q 1/246* (2013.01); *H04W 16/28* (2013.01); *H04W 72/12* (2013.01); *H04L 1/0035* (2013.01); *H04W 36/06* (2013.01)

(58) Field of Classification Search
None
See application file for complete search history.

(56) References Cited

U.S. PATENT DOCUMENTS

| 2010/0322351 | A1 | 12/2010 | Tang et al. | |
| 2011/0044250 | A1* | 2/2011 | Han et al. ...................... | 370/328 |
| 2013/0116011 | A1* | 5/2013 | Lee et al. .................... | 455/562.1 |
| 2013/0130703 | A1* | 5/2013 | Cai et al. ........................ | 455/447 |
| 2014/0105317 | A1* | 4/2014 | Erell et al. .................... | 375/267 |

FOREIGN PATENT DOCUMENTS

WO  2011018121 A1  2/2011

OTHER PUBLICATIONS

Akyildiz et al., The evolution to 4G cellular systems: LTE-Advanced, *Physical Communication 3* (2010) pp. 217-244.
Zyren Jim, Overview of the 3GPP Long Term Evolution Physical Layer, *Freescale Semiconductor, Inc.*, Jul. 2007 pp. 1-25.
PCT Patent Application No. PCT/US2013/028877, International Search Report and Written Opinion, mailed Jul. 24, 2013, 14 pgs.
ZTE: "Considerations of system coexistence simulation for AAS", 3rd Generation Partnership Project (3GPP), 5 pages, vol. RAN WG4, No. 61, San Francisco, USA; Nov. 14-18, 2011.

* cited by examiner

*Primary Examiner* — Ayaz Sheikh
*Assistant Examiner* — Tarell Hampton
(74) *Attorney, Agent, or Firm* — Davidson Sheehan LLP

(57) ABSTRACT

Embodiments of the claimed subject matter provide a method and apparatus for virtual sectorization using an active antenna array. Embodiments of the apparatus include a transmitter for providing signals to an active antenna array. The signals cause the active antenna array to transmit a first reference signal to a first sector indicated to user equipment within the first sector by a sector identifier. The signals also cause the active antenna array to transmit a plurality of second reference signals into a corresponding plurality of second virtual sectors that overlap the first sector. The apparatus also includes a scheduler for scheduling transmission to user equipment based on feedback generated by the user equipment using the first reference signal or the second reference signals.

30 Claims, 9 Drawing Sheets

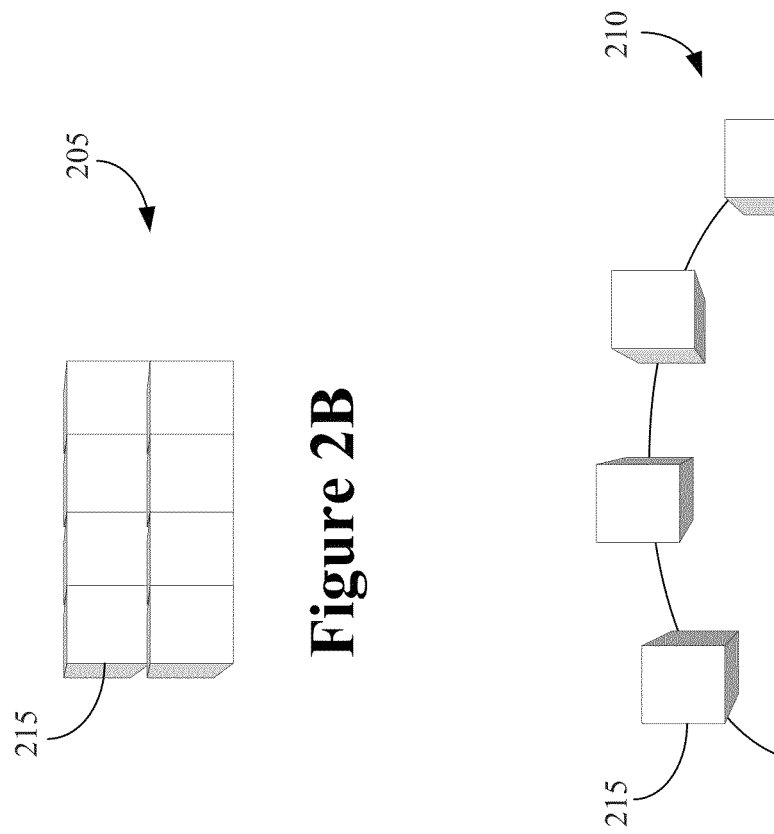
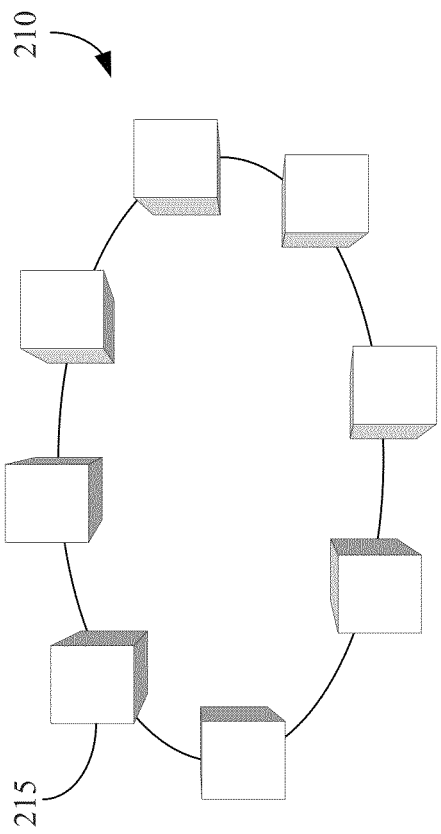
Figure 2B
Figure 2C
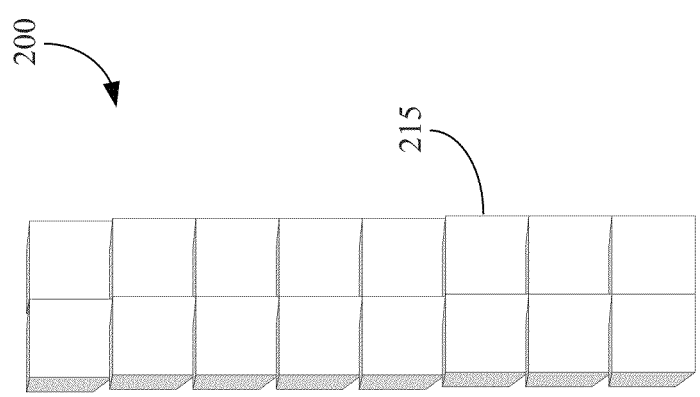
Figure 2A

VIRTUAL SECTORIZATION USING AN ACTIVE ANNTENNA ARRAY

BACKGROUND

This application relates generally to communication systems, and, more particularly, to wireless communication systems.

Wireless communication systems typically deploy numerous base stations (or other types of wireless access points such as eNodeBs) for providing wireless connectivity to user equipment such as mobile units or other wireless-enabled devices. Each base station is responsible for providing wireless connectivity to the user equipment located in a particular cell or sector served by the base station. The air interface between the base station and the user equipment supports downlink (or forward link) channels for carrying information from the base station to the user equipment and uplink (or reverse link) channels for carrying information from the user equipment to the base station. The uplink and/or downlink channels typically include data channels for carrying data traffic such as voice information and control channels for carrying control signal such as pilot signals, synchronization signals, acknowledgment signals, and the like.

Multiple-input-multiple-output (MIMO) techniques may be employed when the base station and, optionally, the user equipment include multiple antennas. For example, a base station that includes multiple antennas can transmit multiple independent and distinct signals to multiple user equipment concurrently and on the same frequency band. MIMO techniques are capable of increasing the spectral efficiency (e.g., the number of bits/second/Hertz) of the wireless communication system roughly in proportion to the number of antennas available at the base station. However, the base station also requires information about the state of the downlink channel(s) to each of the user equipment to select user equipment that have approximately orthogonal downlink channels for concurrent transmission. The channel feedback may be provided by the user equipment on the reverse link, but this increases overhead associated with the MIMO transmissions, which reduces the spectral efficiency of the wireless communication system.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an apparatus is provided for virtual sectorization using an active antenna array. Embodiments of the apparatus include a transmitter for providing signals to an active antenna array. The signals cause the active antenna array to transmit a first reference signal to a first sector indicated to user equipment within the first sector by a sector identifier. The signals also cause the active antenna array to transmit a plurality of second reference signals into a corresponding plurality of second virtual sectors that overlap the first sector. The apparatus also includes a scheduler for scheduling transmission to user equipment based on feedback generated by the user equipment using the first reference signal or the second reference signals.

In another embodiment, a base station is provided for virtual sectorization using an active antenna array. Embodiments of the base station include an active antenna array and a transceiver for transmitting downlink signals and receiving uplink signals via the active antenna array. The downlink signals include a first reference signal transmitted to a first sector indicated to user equipment within the first sector by a sector identifier and a plurality of second reference signals transmitted into a corresponding plurality of second sectors that overlap the first sector. Embodiments of the base station also include a scheduler for allocating user equipment to the first sector or the plurality of second sectors based on feedback generated by the user equipment using the first reference signal or the second reference signals In yet another embodiment, a method is provided for virtual sectorization using an active antenna array. Embodiments of the method include providing signals to an active antenna array. The signals cause the active antenna array to transmit a first reference signal to a first sector indicated to user equipment within the first sector by a sector identifier and to transmit a plurality of second reference signals into a corresponding plurality of second sectors that overlap the first sector. Embodiments of the method also include scheduling transmission to user equipment based on feedback generated by the user equipment using the first reference signal or the second reference signals.

BRIEF DESCRIPTION OF THE DRAWINGS

The disclosed subject matter may be understood by reference to the following description taken in conjunction with the accompanying drawings, in which like reference numerals identify like elements, and in which:

FIGS. 2A, 2B, and 2C depict three exemplary embodiments of active antenna arrays;

Figure 1:
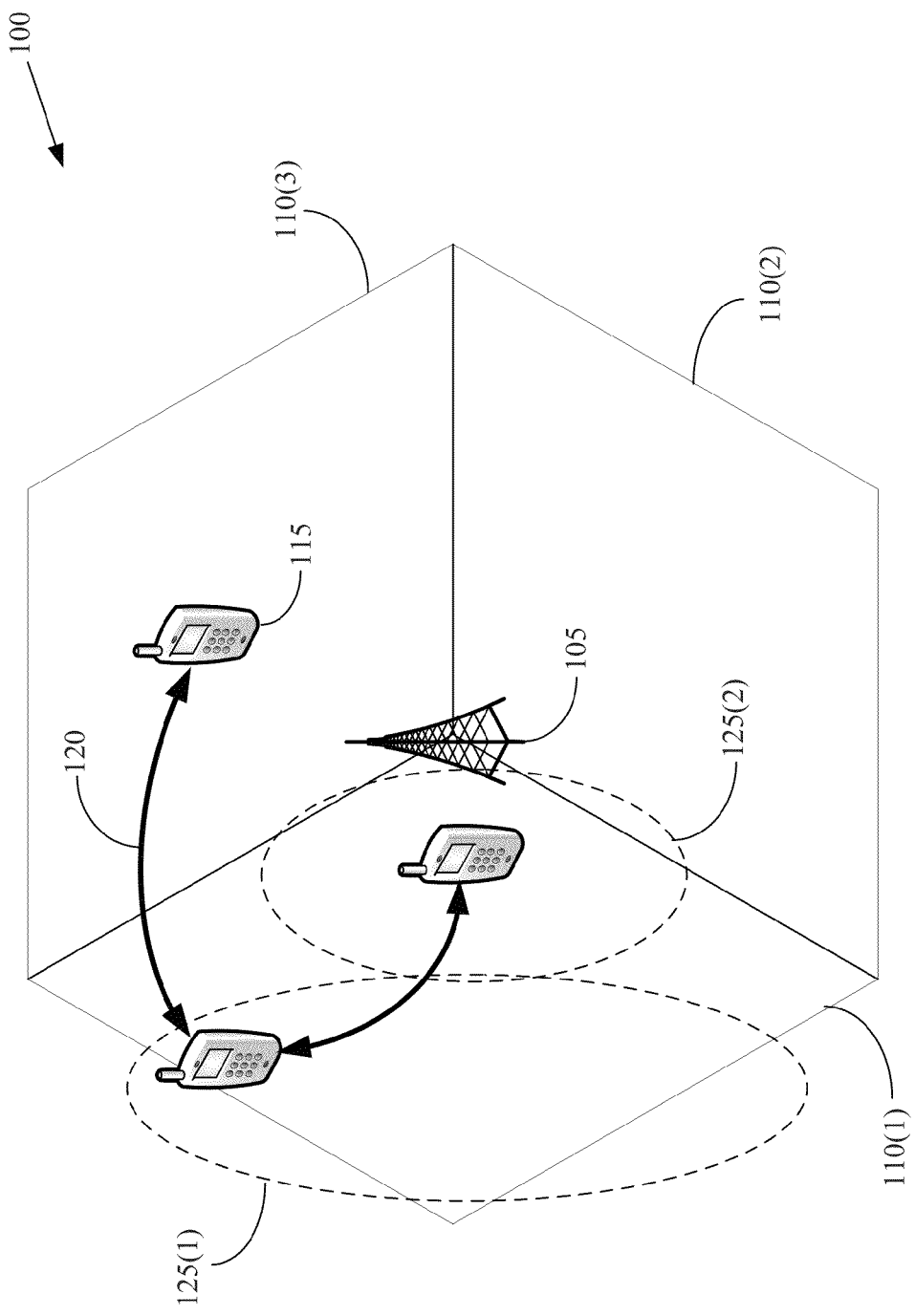
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Antenna deployments for wireless communication systems are becoming easier to configure. For example, small and inexpensive antennas can be deployed in active antenna arrays, which may also be referred to as phased antenna arrays. Modular antennas that include integrated radiofrequency transceivers can be stacked or arranged to form arrays have any geometry, size, or power output. A vertical antenna array can be created by stacking the modular antenna elements vertically in a single antenna enclosure. Square or rectangular arrays can be deployed on building façades or in public places such as train stations and airports. Circular arrays with omnidirectional or directional elements can be installed on poles, towers, lampposts, or the like. The antenna configuration parameters such as the antenna tilt or the pilot power are determined statically in conventional cellular communication networks to provide a particular radio coverage pattern, which may be verified using drive-by testing. The conventional approach is time-consuming and may not be suitable for varying the antenna configuration parameters dynamically, e.g. to reflect channel environment changes, changes in traffic loading, or other changes. Furthermore, although the beamforming capabilities of an active antenna array can be used to provide coverage to particular sectors, modifying the antenna parameters associated with different sectors may be complicated by the requirement that user equipment hand off between the different sectors.

Recent advances in antenna design that include multiple transceivers integrated in the radio allow flexible beamforming utilizing vertical antenna arrays. Vertical beamforming enhances the spectral efficiency or the coverage of the cellular communication system by supporting flexible vertical tilt, beam shaping capability, or forming multiple beams within conventional sectors. At least in part to address drawbacks in the conventional practice, the present application describes embodiments of techniques for using beamforming to provide virtual sectors that overlap portions of a base coverage area. For example, a base station can be configured to provide signals that drive an active antenna array so that the array transmits a common reference signal (or other common signaling channels) throughout a sector (which may be referred to as the base sector) that is identified by a unique sector identifier. Virtual sectors that overlap the base sector may be defined by the coverage areas of one or more beams formed by the active antenna array. A unique channel state information-reference signal (CSI-RS) is assigned to each beam for transmission into the corresponding virtual sector. User equipment that move between sectors identified by different sector identifiers are handed off between the different sectors, but user equipment that move between different virtual sectors do not need to be handed off because the different virtual sectors use the same sector identifier, i.e., the sector identifier of the base sector.

A scheduler in the base station can schedule user equipment for uplink/downlink transmission in the base coverage area or in one of the virtual sectors. For example, the scheduler can allocate user equipment to a virtual sector associated with a particular channel state information-reference signal (CSI-RS) based upon an estimate of the location of the user equipment. The virtual sector reference signals such as the CSI-RS may be mapped to individual beams so that user equipment can uniquely identify the beam. User equipment can also perform channel quality measurements using the common reference signal or one or more CSI-RS signals. The user equipment may then report the estimated channel quality back to the base station. Since the virtual sectors share the same sector identifier, the scheduler is able to schedule the user equipment for communication in the different virtual sectors and the user equipment can transition between the virtual sectors without handing off between two different sectors. Furthermore, the location or coverage areas of the virtual sectors can be dynamically changed using beamforming in response to changes in the environment, traffic loading, or the like without incurring the overhead cost of handing off user equipment during redistribution into the modified virtual sectors.

FIG. 1 conceptually illustrates a first exemplary embodiment of a wireless communication system 100. In the illustrated embodiment, the wireless communication system 100 includes a base station 105 for providing wireless connectivity in one or more sectors 110(1-3). As used herein, the term "sector" refers to a geographical area served by one or more antennas in the base station 105. The boundaries of sectors may be defined by transmission powers of the base station, a beamwidth or angular extent of a radiation pattern defined by the antenna configuration, and other factors such as geography, topology, physical obstructions, and other environmental factors. The term "sector" may be synonymous with the term "cell" or it may refer to a subset of a particular cell associated with a base station. In the illustrated embodiment, each sector 110 is assigned to a sector identifier that identifies the sector within the communication system 100.

The base station 110 may transmit a different common reference signal (CRS) into each of the sectors 110. In one embodiment, the common reference signals may be generated using an orthogonal sequence and a pseudo-random numerical sequence. Each reference signal may then be assigned to a different one of the sectors 110 and may act as a cell-specific identifier to user equipment 115 operating within the corresponding sector 110. In the illustrated embodiment, the sector coverage area is determined by the CRS coverage area. The transmit power of these channels may be determined to provide the coverage requirements determined by sector planning and inter-sector traffic loading. In embodiments that operate according to the standards and/or protocols defined by different releases of the Third Generation Partnership Project (3GPP), demodulation for Rel-8/9 user equipment and reception of common channels for Rel-10 user equipment may rely on CRS channel estimation in a cell deployment with virtual sectors, as discussed herein. User equipment that operate according to Rel-8 may use CRS for channel state information (CSI) reporting, e.g., channel quality indication (CQI) reports, precoding matrix information (PMI), or rank indicator (RI). Other common channels such as control channels (PCFICH, PHICH, PDCCH), synchronization channels (PSS and SSS) and 3GPP Rel-8/9 channels may also be transmitted throughout the coverage area of the sector 110, e.g., the common channels may be transmitted without beamforming by the antennas in the base station 105. Alternatively, 3GPP Rel-8/9 channels may be transmitted with beamforming.

User equipment 115 may move between the different sectors 110, e.g., as indicated by the arrow 120. Movement between the sectors 110 may be a consequence of actual movement of the user equipment 115 or because of variations in the channels or coverage area that may be caused by variability in environmental conditions, intermittent presence of obstructions, or other time variable factors. User equipment 115 may be required to handoff whenever they move between sectors 110 that utilize different sector identifiers. The handoff may be a hard hand off, a soft handoff, or a softer handoff. The handoff procedure generates significant signaling and processing overhead to hand off sessions between the entities that handle communication within the different sectors 110. For example, each sector 110 may use a different set of antennas, a different scheduler, or other hardware, firmware, or software within the base station 105. Techniques for handing off user equipment 115 are known in the art and in the interest of clarity only those aspects of handoff that are relevant to the claimed subject matter are discussed in detail herein.

Virtual sectors 125 may also be defined to overlap one or more of the sectors 110. In the illustrated embodiment, the virtual sectors 125 are defined by coverage areas of different beams created using an active antenna array that is driven by signals provided by the base station 105. As used herein, the term "virtual sector" refers to a geographic area that overlaps with a sector and shares the sector identifier with the overlapping sector. Virtual sectors are defined by the coverage area of one or more beams that are identified using an associated reference signal such as a channel state information-reference signal (CSI-RS). In one embodiment, the CSI-RS signals may be defined in addition to the common reference signals that are transmitted by the base station into the coverage area of the corresponding sector 110. For example, the Long Term Evolution-Advanced (LTE-A) standards and protocols defined by the 3GPP support CSI-RS signals that may be used to estimate the channel quality for different frequencies or channels that are assigned to user equipment and the corresponding virtual sector. These signals may be transmitted by a selected antennas within a selected grid of resource elements in the physical resource blocks, e.g., within the grid of OFDM symbols and subcarriers defined by the LTE-A standards.

Communication with user equipment 115 in the virtual sectors 125 of a sector 110(1) may be controlled or coordinated by a common scheduling resource such as a scheduler implemented using hardware, firmware, or software in the base station 105. User equipment 115 may therefore communicate with the base station 105 using one set of resources when it is located in the virtual sector 125(1) and a different set of resources when it is located in the virtual sector 125(2). Transitions between the virtual sectors 125 do not require handing off the user equipment 115 because the virtual sectors 125 are both associated with the same sector identifier, i.e., the sector identifier of the sector 110. Consequently, the transitions of the user equipment 115 between the virtual sectors 125 can be controlled by the common scheduling resource in the base station 105 thereby significantly reducing the overhead required for the transition relative to the overhead that would be incurred to perform a handoff.

In one embodiment, the base station 105 includes an active antenna array (not shown in FIG. 1) and beams used for virtual sectors 125 can be created anywhere within the radio coverage area of the active antenna array using the dynamic tilt or beamforming capabilities of the array. The beam can be adjusted dynamically by adjusting the tilt, beam pattern, or power allocation. In various alternative embodiments, multiple beams can be created within the footprint. The process of implementing or operating the virtual sectors 125 may be referred to as "virtual sectorization." Exemplary radio network design principles, MIMO schemes, and scheduling and link adaptation algorithms associated with virtual sectors are described herein. In various alternative embodiments, virtual sectors may be created in any location that overlaps the conventional antenna coverage area, e.g., the coverage area defined by a common reference signal or other pilot signal. The beam tilt, the beam shape, or the transmit power of antennas in the active antenna array may be adjusted semi-statically or dynamically to define or modify the virtual sectors 125 depending on the radio channel environment, the traffic loading, or other factors. Power conservation techniques such as reducing transmit powers into virtual sectors 125 that have small numbers of active user equipment 115 may also be implemented by adjusting the active antenna array parameters. For example, the transmission powers of different antenna elements in the active array may be reduced or even turned off. In some embodiments, operational efficiency of the cellular communication system 100 can be improved by implementing self-optimizing network (SON) features, coverage and capacity features, or traffic loading management.

FIGS. 2A, 2B, and 2C depict three exemplary embodiments of active antenna arrays 200, 205, 210. The illustrated embodiments show different arrangements of individual antenna elements 215. FIG. 2A depicts a vertical linear array 200 including 16 interconnected antenna elements 215. FIG. 2B depicts a horizontal linear array 200 including eight interconnected antenna elements 215. FIG. 2C depicts a circular array 210 including eight interconnected antenna elements 215. Square or rectangular arrays 200, 205 may be particularly suitable for deployment on building façades or in public places such as train stations and airports. Circular arrays 210 with omnidirectional or directional elements may be particularly suitable for installation on poles, towers, lampposts, or the like. However, persons of ordinary skill in the art having benefit of the present disclosure should appreciate that the particular array structures, numbers of antenna elements 215, and deployment scenarios shown in FIGS. 2A-C are intended to be illustrative and not limiting except as explicitly set forth in the claims.

Embodiments of the active antenna arrays 200, 205, 210 may be configured to support different beamforming capabilities. For example, embodiments of the active antenna arrays 200, 205, 210 may support beamforming capabilities such as digital tilt, differentiated tilt per carrier/band, differentiated uplink/downlink (UL/DL) tilt, flexible beam shaping capability, or vertical beamforming with multiple beams from the array with flexible power sharing between the beams. The different beams created by the active antenna arrays 200, 205, 210 may form inner and outer coverage areas within a conventional cellular system layout. In virtual sectorization, the multiple beams are mapped to coverage areas within the same sector, as discussed herein. Various embodiments of the active antenna arrays 200, 205, 210 may support different combinations of the beamforming capabilities described herein, as well as other beamforming capabilities.

Figure 3A:
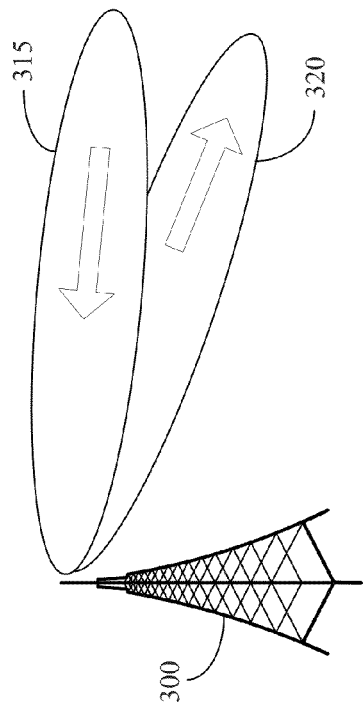
FIGS. 3A, 3B, 3C, and 3D depict exemplary capabilities of different embodiments of an active antenna array deployed on a base station.
Figure 3B:
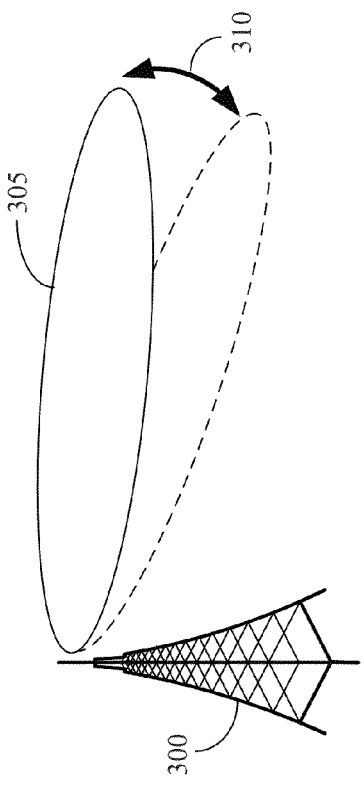
Figure 3C:
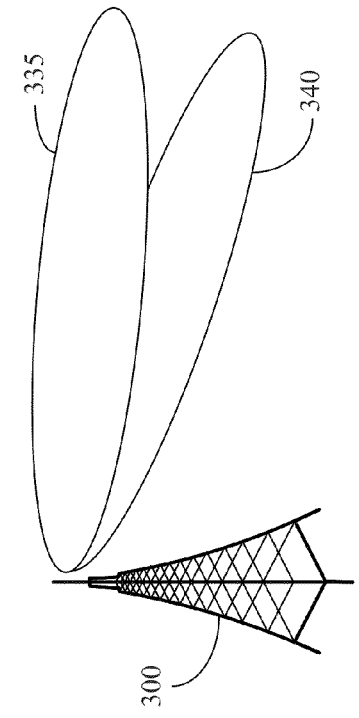
Figure 3D:
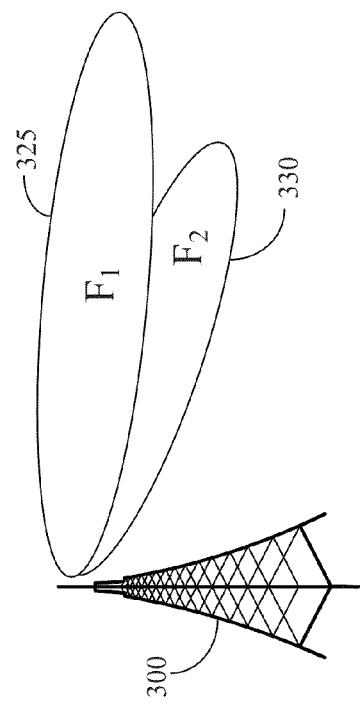

FIGS. 3A, 3B, 3C, and 3D depict exemplary capabilities of different embodiments of an active antenna array deployed on a base station 300. Although the embodiments depicted in these figures are associated with the base station 300, persons of ordinary skill in the art having benefit of the present disclosure should appreciate that different embodiments of the base station 300 may be able to perform different combinations of some or all of the capabilities depicted in these figures. FIG. 3A shows the digital tilt of a beam 305 through an angle indicated by the arrow 310. FIG. 3B depicts a differentiated tilt between beams 315, 320 that are used for uplink and downlink transmission, respectively. FIG. 3C depicts a differentiated tilt between beams 325, 330 that are used for different frequencies, carriers, or bands ($F_1, F_2$). FIG. 3D depicts vertical beamforming in which a beam 335 is directed towards a higher vertical location and a beam 340 is directed towards a relatively lower vertical location.

Figure 4:
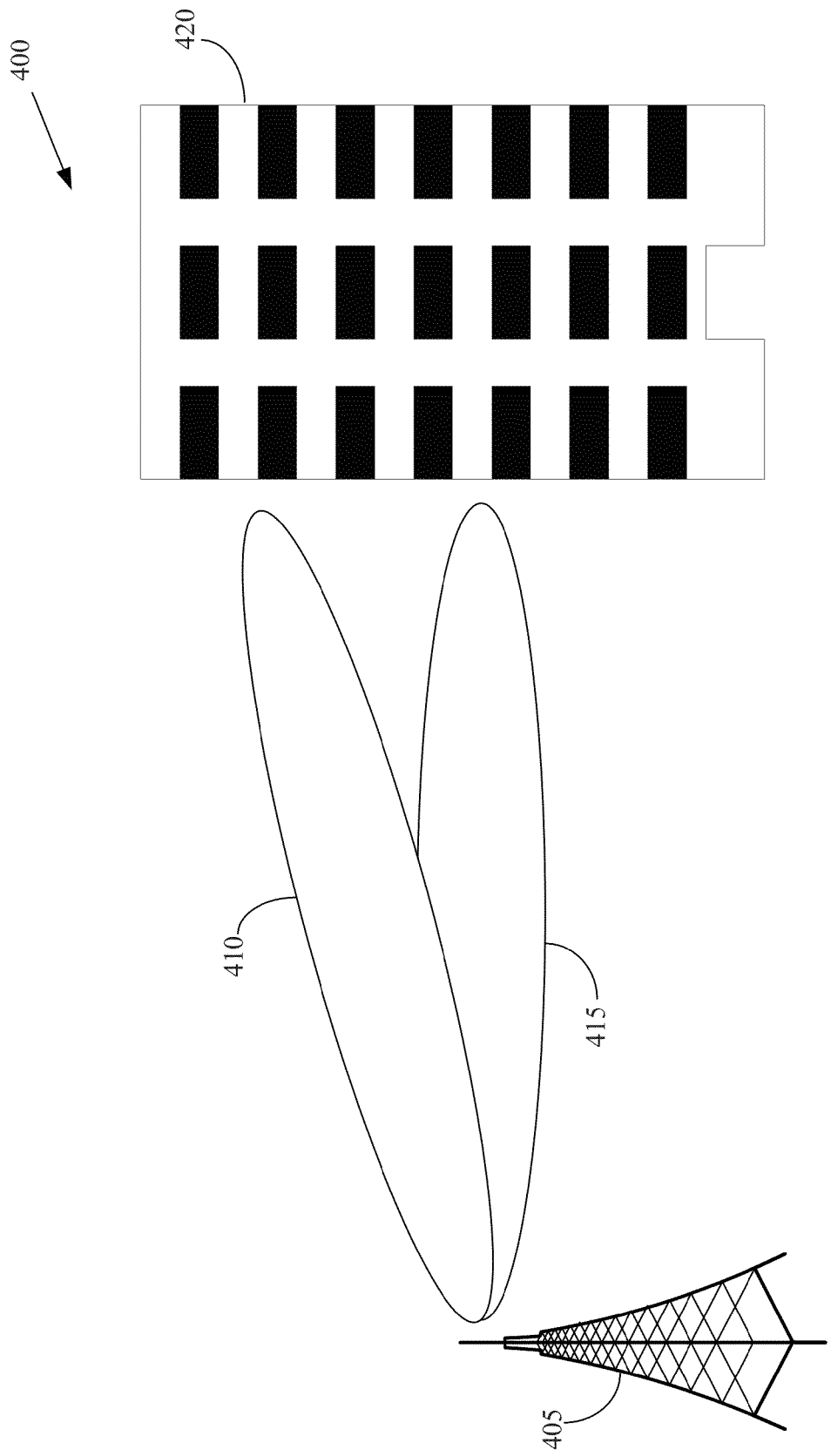
FIG. 4 conceptually illustrates a second exemplary embodiment of a wireless communication system.

FIG. 4 conceptually illustrates a second exemplary embodiment of a wireless communication system 400. In the illustrated embodiment, the wireless communication system 400 includes a base station 405 that uses vertical beamforming to provide different beams 410, 415 to different locations within a building 420. For example, the beams 410, 415 may be formed so that the center of the beam (e.g., as defined by the highest signal strength of the beam at the receiver) is focused on a particular floor within the building 420. Although two beams 410, 415 are depicted in FIG. 4, persons of ordinary skill in the art having benefit of the present disclosure should appreciate that different numbers of beams may be supported. For example, the base station 405 may include an active antenna array that is configured to provide one beam to each floor of the building 420, multiple beams to highly occupied floors of the building 420, no beam to an unoccupied floor of the building 420, or other configurations.

Figure 5:
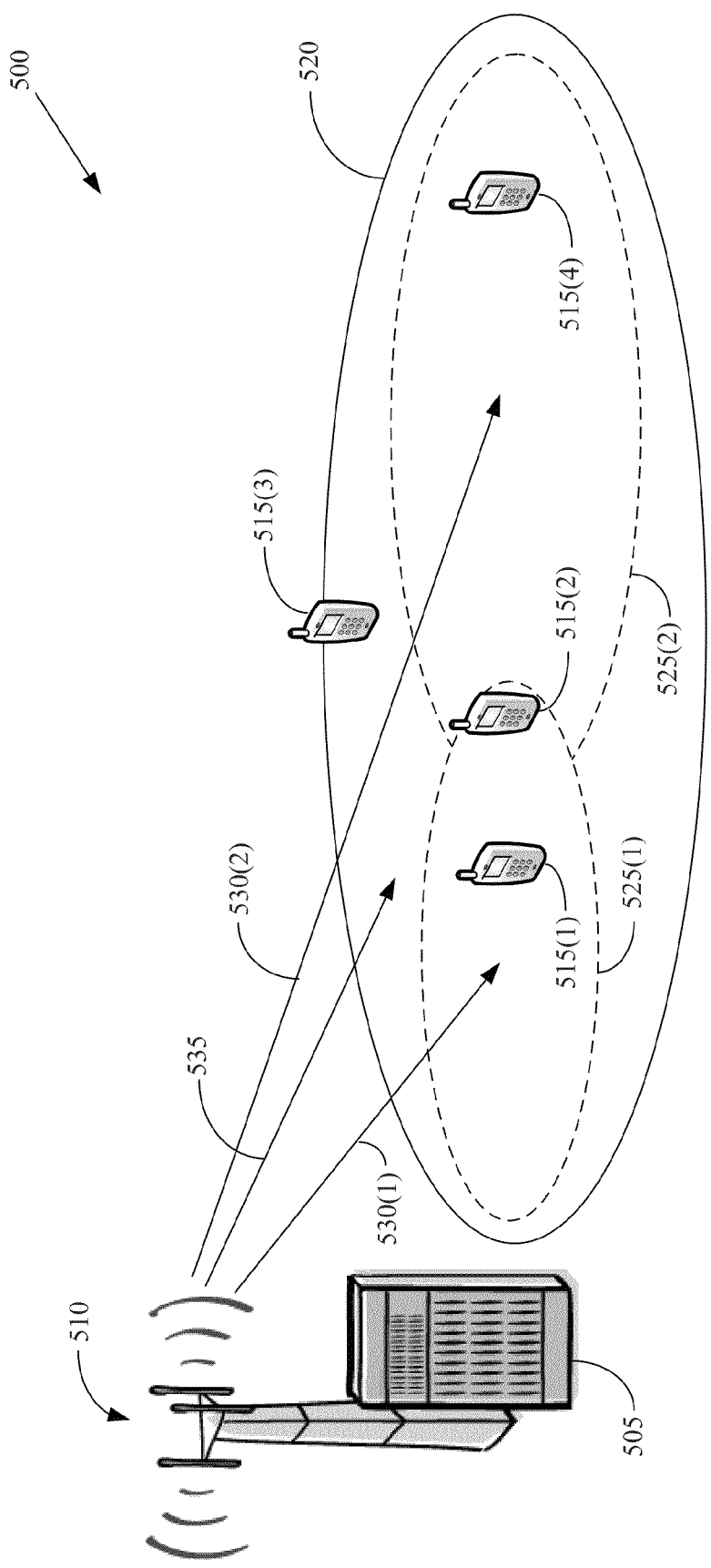
FIG. 5 conceptually illustrates a third exemplary embodiment of a wireless communication system.

FIG. 5 conceptually illustrates a third exemplary embodiment of a wireless communication system 500. In the illustrated embodiment, the wireless communication system 500 includes a base station 505 that can provide signals to an active antenna array 510 and receive signals from the active antenna array 510. The active antenna array 510 supports wireless communication with user equipment 515 in the sector 520 and the virtual sectors 525.

In the illustrated embodiment, the virtual sectors 525 may be created and mapped to the different beams 530 created by the active antenna array 510. For example, the virtual sectors 525 may include an inner sector 525(1) and an outer sector 525(2) when vertical beamforming is used. Alternatively, for embodiments of the active antenna array 510 that support horizontal and vertical beamforming, the virtual sectors 525 may be created anywhere within the vertical or azimuthal directions related to a horizontal sector such as the sector 505. The virtual sectors 525 may both be assigned the sector identifier associated with the sector 505. Virtual sectors 525 may be identified by a unique CSI-RS or at least sufficiently unique to allow the virtual sectors 525 to be distinguished from each other using the CSI-RS and other information available to user equipment 515.

User equipment 515 may be configured with a CSI-RS corresponding to the virtual sector 525 that includes the user equipment 515 so that the user equipment 515 can perform measurements using the received CSI-RS. For example, user equipment 515 may use the reference signals to measure channel state information (CQI, RI, or PMI) and transmit reports indicating the result of the measurements back to the base station 505. In one embodiment, allocation of the user equipment 515 to a CSI-RS is performed based on estimates of the location of the user equipment 515. For example, to support virtual sectorization in elevation, the location of the user equipment 515 may be estimated based on channel reciprocity using one or more uplink channel measurements performed at the base station 505 such as sounding reference signal (SRS) measurements, measurements of the timing advance, or downlink (DL) PL measurement reporting. In embodiments that support virtual sectorization in azimuth and elevation, the base station 505 can estimate the location of the user equipment 515 using channel reciprocity techniques such as vertical estimation or angle-of-arrival estimation based on received uplink signals from the user equipment 505. In some embodiments, user equipment 515 may be configured to support multiple CSI-RS reporting in which the user equipment 515 may report multiple CSI (e.g., CQI, RI, or PMI) determined based upon different CSI-RS associated with different virtual sectors 525. Embodiments of the base station 505 may then perform dynamic beam switching or dynamic MU-MIMO scheduling dynamically using the multiple reports.

The base sector 520 in the illustrated embodiment is identified by a unique common reference signal (CRS) and the coverage area of the base sector 520 is determined by the CRS coverage area. The base station 505 may transmit common channels such as control channels (PCFICH, PHICH, and PCCH), synchronization channels (PSS and SSS), or Rel-8/9 channels without performing beamforming using the active antenna array 510. The transmit power of the common channels may be selected to provide coverage determined by cell planning or inter-cell traffic loading. Demodulation (for Rel-8/9 user equipment) and reception of common channels (for Rel-10 user equipment) may utilize CRS channel estimation even though the wireless communication system 500 supports virtual sectors 525. User equipment 515 that are configured to receive CSI-RS signals (such as Rel-10 user equipment) can use the CSI-RS signals for CSI reporting when they are assigned to a virtual sector 525. Legacy user equipment 515 that may not be configured to receive CSI-RS signals (such as Rel-8 user equipment) may alternatively use the CRS for CSI reporting.

Embodiments of the base station 505 may transmit common channels in the virtual sectorized system 500 using one or more of the beams 530 or using a separate beam 535. For example, common channel coverage may be provided by outer beam 530(2), which may cover more than 80% of the geographic area in some deployments. For another example, common channels may be mapped to both the inner and outer beams 530. In this case, common channels are combined over the air and received at the user equipment 515. For yet another example, one or more additional beams 535 may be used to transmit common channels into regions that are not covered by the virtual sector beams 530. Embodiments of the first two options may advantageously limit the number of beams to a number that is lower than the third option.

FIGS. 6A, 6B, 6C, 6D show exemplary embodiments of coverage areas of beams used to transmit common reference signals associated with a base sector in a virtual sectorized system. Persons of ordinary skill in the art having benefit of the present disclosure should appreciate that these exemplary embodiments are illustrative and are not necessarily intended to be mutually exclusive nor are they intended to be an exhaustive list of configurations that can be used in wireless communication systems. Alternative embodiments may include combinations of the embodiments of the coverage areas shown in these figures or may include alternative coverage areas. In each of the exemplary embodiments, a base station 600 uses an active antenna array to provide a common reference signal associated with a base sector 605 and other reference signals such as CSI-RS to respective virtual sectors 610, 615. The coverage area of the common reference signal is indicated by the crosshatching in each case.

Figures 6A, 6B, 6C, 6D:
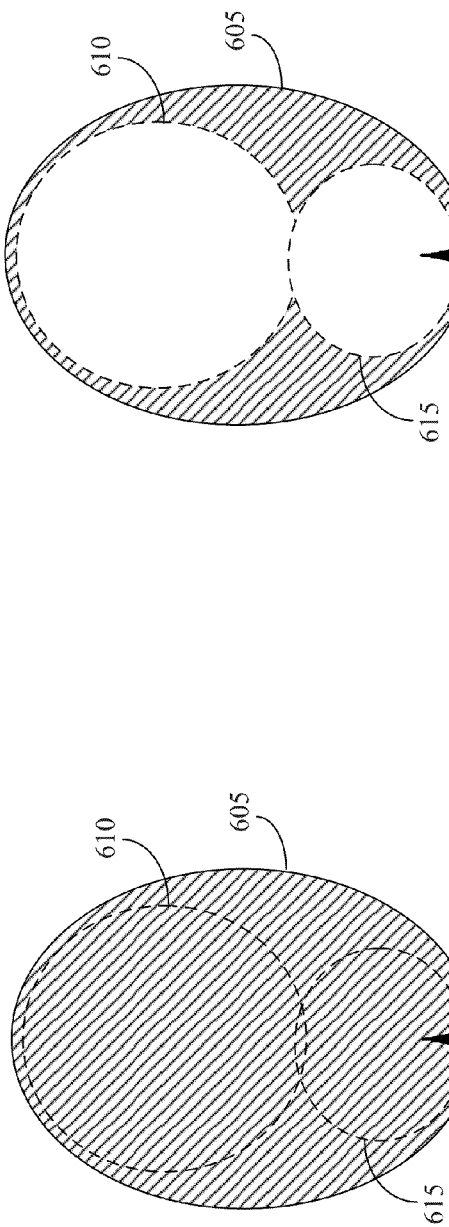
FIGS. 6A, 6B, 6C, 6D show exemplary embodiments of coverage areas of beams used to transmit common reference signals associated with a base sector in a virtual sectorized system.

FIG. 6A depicts one exemplary embodiment in which the coverage area of the common reference signal is provided by one or more dedicated beams that cover substantially all of the coverage area 605, including the coverage areas of the virtual sectors 610, 615. FIG. 6B depicts one alternative embodiment in which the coverage area of the common reference signal is provided by one or more dedicated beams that provide coverage to the portions of the base sector 605 that do not substantially overlap with the virtual sectors 615. FIG. 6C depicts an alternative embodiment in which the common reference signal is transmitted by the beams that are also used to transmit the reference signals for the virtual sectors. In this case, user equipment may combine common reference signals transmitted over the air by the two beams when they are in overlapping regions of the virtual sectors 610, 615. FIG. 6D depicts another alternative embodiment in which the common reference signal is transmitted by the beam that is used to transmit the reference signals for the virtual sector 610.

Figure 7:
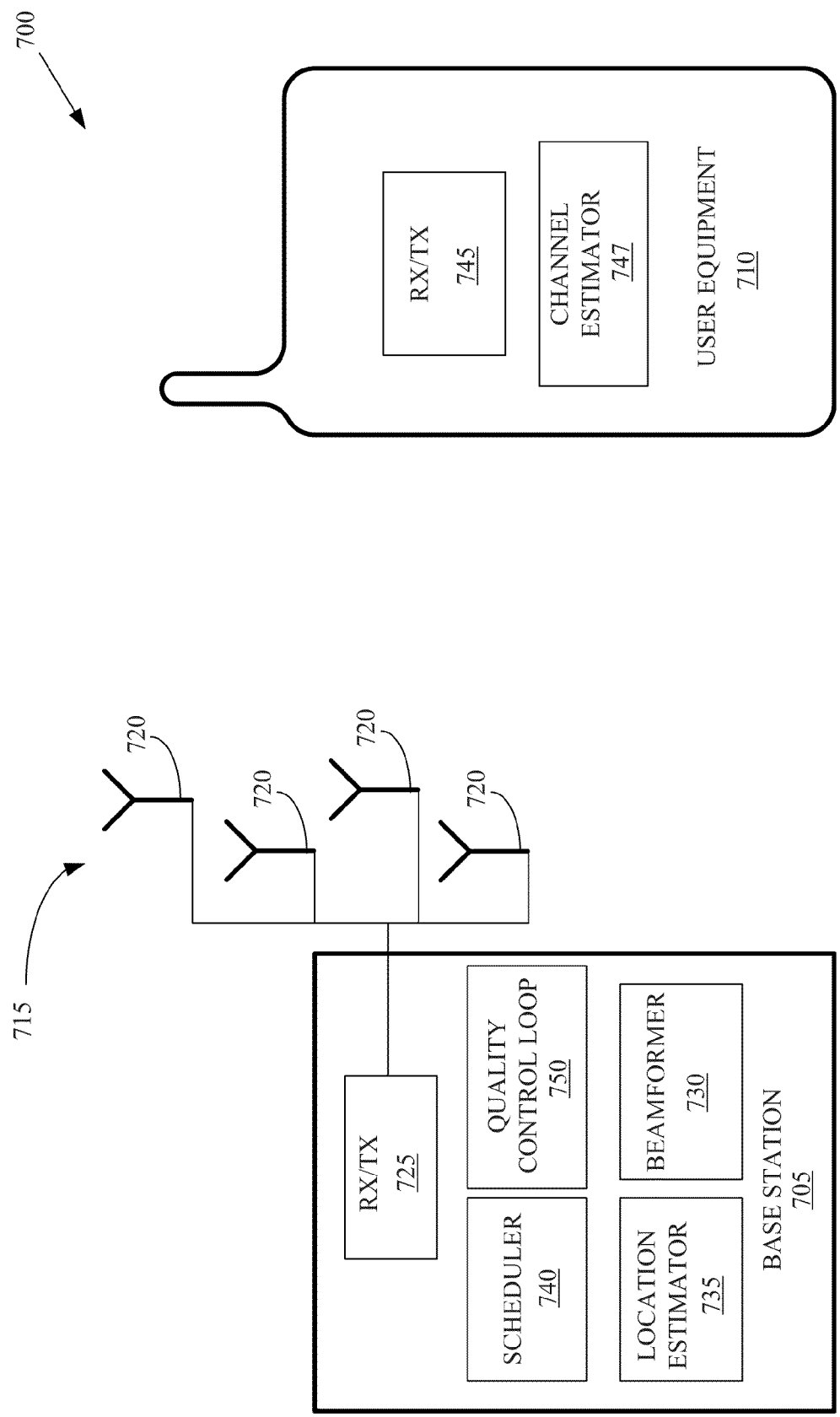
FIG. 7 conceptually illustrates a fourth exemplary embodiment of a wireless communication system.

FIG. 7 conceptually illustrates a fourth exemplary embodiment of a wireless communication system 700. In the illustrated embodiment, the wireless communication system whose one or more base stations 705 for providing uplink/downlink wireless connectivity to one or more user equipment 710. The base station 705 is electromagnetically and/or communicatively coupled to an active antenna array 715 that includes multiple antennas 720 for transmitting downlink signals to the user equipment 710 and receiving uplink signals from the user equipment 710. A transceiver (RX/TX) 725 in the base station 705 is used to generate signals and provide the signals to the antenna array 715 to drive the downlink transmissions. The transceiver 725 may also be configured to receive uplink signals from the antenna array 715. As discussed herein, the base station 705 is configured to perform virtual sectorization.

In the illustrated embodiment, the base station 705 includes a beamformer 730 that is used to determine the beamforming parameters such as tilt, power, or relative phase differences between transmissions over the different antennas 720 that are used to define the beams for each virtual sector. Techniques such as pre-coding for defining the beamforming parameters for beams having particular beamwidths, elevations, transmission powers, frequencies, or other parameters are known in the art and in the interest of clarity will not be discussed in detail herein. In one embodiment, the beamformer 730 may be configured to steer the virtual sectors toward hot-spot areas, toward building floors for traffic off-loading, or towards any other location or area. The beamformer 730 may define one or more virtual sectors depending on the traffic distribution of the user equipment 710 or other criteria. The virtual sectors may also be steered based on the traffic loading so the locations of the virtual sectors may be changed when the traffic loading changes from one area to another. Furthermore, the coverage area of the virtual sectors may be small or large (and increased or decreased) depending on the traffic loading or other criteria. In one embodiment, the coverage area of one or more of the virtual sectors can be changed by adjusting the CSI-RS power of the virtual sector. The beam pattern and the antenna tilt of the antennas 720 that support the virtual sectors may also be optimized depending on traffic loading or other criteria. The transceivers 715 that drive the active antenna array 720 may be switched on or off depending on the location of the virtual sectors, traffic loading, for interference management, for power conservation, or for other purposes.

In one embodiment, the beamformer 730 may be used to define the same set of virtual sectors for uplink and downlink transmissions. Alternatively, different sets of virtual sectors may be defined for the uplink transmissions and the downlink transmissions. For example, the beamformer 730 may define multiple virtual sectors for downlink transmissions in order to improve overall downlink capacity and define a single virtual sector for uplink reception to improve the multiuser-multiple-in-multiple-out (MU-MIMO) gains to provide improved uplink coverage. Using a single virtual sector for the reception of uplink transmissions may be beneficial at least in part because uplink signals are often not directional.

A location estimator 735 may also be implemented in the base station 705. In one embodiment, the location estimator 735 is configured to determine or estimate locations of user equipment 710, e.g. using channel reciprocity techniques. The estimated locations can then be used to assign the user equipment 710 to a virtual sector by comparing the estimated location of the user equipment 710 to the coverage areas of the virtual sectors. In one embodiment, the location estimator 735 may perform the location estimates periodically, in response to some event, or at other selected intervals. For example, the location estimator 735 may be used to estimate locations of the user equipment 710 in response to changes in the virtual sectors performed by the beamformer 730. The revised location estimates may then be used to maintain or change assignment of the user equipment 710 to the virtual sectors defined by the beamformer 730.

A scheduler 740 is used to schedule uplink or downlink transmissions between the base station 705 and user equipment 710. In one embodiment, the scheduler 740 may also be used to perform or implement link adaptation algorithms associated with the virtual sectors defined by the beamformer 730. In one embodiment, the scheduler 740 is configured to implement single user or multi-user scheduling depending criteria or parameters such as the estimated locations of the user equipment 710 or CSI feedback from the user equipment 710. For example, the scheduler 740 may implement single user scheduling so that one user equipment 710 is scheduled in a given time-frequency resource when the user equipment 710 is in a region corresponding to overlapping areas covered by beams associated with different virtual sectors. For another example, the scheduler 740 may use multiple user scheduling to schedule different user equipment 710 in virtual sectors associated with different beams when the different user equipment 710 are separated spatially so that the channel state information (CSI) between the different user equipment 710 are orthogonal. Interference between the virtual sectors may be managed dynamically by scheduler 740, e.g. using either frequency division multiplexing (FDM) or time division multiplexing (TDM).

In the illustrated embodiment, the scheduler 740 is also responsible for distributing user equipment 710 between the virtual sectors. For example, the scheduler 740 may change the assignment of user equipment 710 from one virtual sector to another when user equipment 710 moves through different locations within the base sector or when environmental conditions change the coverage areas of the virtual sectors. The scheduler can change the virtual sector assignment of the user equipment 710 without having to perform handover of the user equipment 710 because the virtual sectors share the same sector identifier (i.e., the sector identifier of the base sector).

Feedback from the user equipment 710 can be used to determine the location of the user equipment, choose beamforming parameters, or schedule uplink or downlink transmissions. In the illustrated embodiment, the user equipment 710 includes a transceiver (RX/TX) 745 for receiving downlink signals from the base station 705 and transmitting uplink signals to the base station 705. The user equipment 710 includes a channel estimator 747 that can use reference signals transmitted by the base station 705 to estimate parameters of the air interface communication channels between the base station 705 and the user equipment 710. For example, one embodiment of an estimator 747 in Rel-10 user equipment 710 can use the CSI-RS signals associated with their virtual sectors to determine channel quality information, which can be fed back to the base station 705.

In one embodiment, legacy user equipment 710 that are not configured to receive CSI-RS signals may use the common reference signal transmitted into the base sector to estimate the channel quality information that may then be fed back to the base station 705. For example, the user equipment 710 may be assigned to a virtual sector and the traffic channels may be beam formed into the virtual sector even though the user equipment 710 is not able to receive the CSI-RS that is transmitted into the virtual sector. The user equipment therefore generates the channel quality feedback based upon the common reference signal associated with the overlapping base sector. However, there may be a gain mismatch between the channel quality estimation performed by the legacy user equipment 710 based upon the common reference signal, which may not be beam formed, and the traffic channels that are beam formed into the virtual sector. A modulation and coding scheme mismatch may therefore occur if the CRS-based feedback is used to estimate channels and determine the modulation and coding scheme (MCS) for the beam formed traffic channels.

The base station 705 may therefore include a quality control loop 750 that is used to compensate for the gain mismatch. In one embodiment, the quality control loop 750 may determine a first MCS for the legacy user equipment 710 scheduled on one of the second virtual sectors. The quality control loop 750 may then apply corrections to the channel quality feedback or modify the first MCS when the quality control loop 750 determines that the feedback provided by the legacy user equipment was estimated based upon a common reference signal and not the beam formed CSI-RS associated with the virtual sector assigned to the legacy user equipment 710. In one embodiment, corrections to the channel quality feedback or modifications of the MCS may be calculated based on different characteristics of the common reference signal and the CSI-RS. For example, the quality control loop 750 may allocate higher-order modulation and coding schemes to legacy user equipment 710 that are assigned to virtual sectors that are benefiting from reduced interference such as virtual sectors that are located relatively close to the base station 705. The scheduler 740 may then schedule transmission towards the legacy user equipment 710 using the corrected feedback or the modified MCS.

Self-optimizing network (SON) techniques may also be implemented in embodiments of the wireless communication system 700 to improve coverage, capacity, or energy efficiency. In one embodiment, the beamformer 730 may adjust antenna parameters for virtual sectors such as downtilt, azimuth angle, or the antenna radiation pattern for traffic load balancing or traffic steering. The transmission power of the pilot signals allocated to the virtual sectors may also be adjusted based on a selected trade-off between capacity and coverage. Furthermore, the transmission power of the virtual sectors can be adjusted depending on traffic loading or other criteria.

Figure 8:
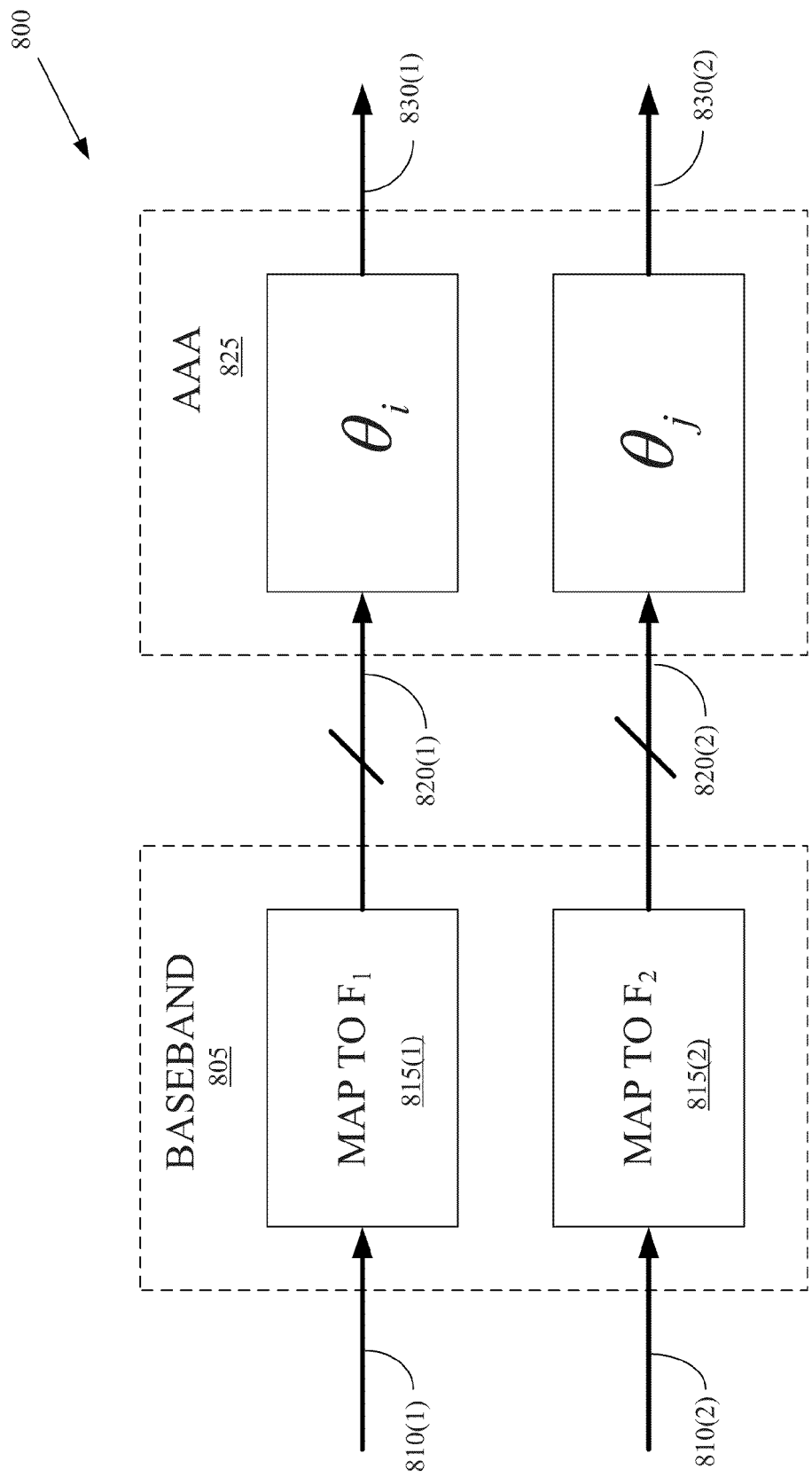
FIG. 8 conceptually illustrates one exemplary embodiment of functionality used to map traffic streams to virtual sectors.

FIG. 8 conceptually illustrates one exemplary embodiment of functionality 800 used to map traffic streams to virtual sectors. The functionality 800 may be implemented using hardware, firmware, or software in base stations such as the base stations depicted in other embodiments described in the present application. In the illustrated embodiment, the functionality 800 includes a baseband 805 that is configured to receive multiple user traffic streams 810. For example, downlink traffic 810(1) destined for a first user equipment and downlink traffic 810(2) destined for a second user equipment may both be concurrently provided to the baseband 805. Mapping elements 815 can be used to map the downlink traffic to different channel streams 820. For example, the baseband 805 may use the mapping elements 815 to map the downlink traffic 810 to channel streams 820 defined by different frequencies ($F_1$, $F_2$). However, persons of ordinary skill in the art having benefit of the present disclosure should appreciate that different embodiments of the mapping elements 815 may be used to map the downlink traffic 810 to channels or streams that are distinguished by properties such as channel coding, frequency, time, subcarrier, or other properties or combinations of these properties.

In the illustrated embodiment, the functionality 800 includes an active antenna array (AAA) 825 configured to transmit at least two different beams 830 to different virtual sectors. For example, the beams 830 may be configured to have different downtilt values ($\theta_i$, $\theta_j$) corresponding to an inner beam 830(1) and an outer beam 830(2). The downtilt values or other parameters of the beams 830 may be determined based on a network deployment, distributions of user equipment, or other criteria. However, as discussed herein, other parameters of the beams 830 may be used to define the virtual sectors. User equipment may then be allocated to the beams 830 based on the location of the user equipment. For example, elevation angles corresponding to the different user equipment can be estimated as discussed herein. The user equipment can then be scheduled to one of the frequency channels that is beam formed with an elevation angle corresponding to the estimated elevation angle of the user equipment. The baseband 805 may also determine the appropriate phase differences between signals transmitted by the different antennas in the active antenna array 825 to generate the beams 830 and provide this information in conjunction with the streams 815.

Figure 9:
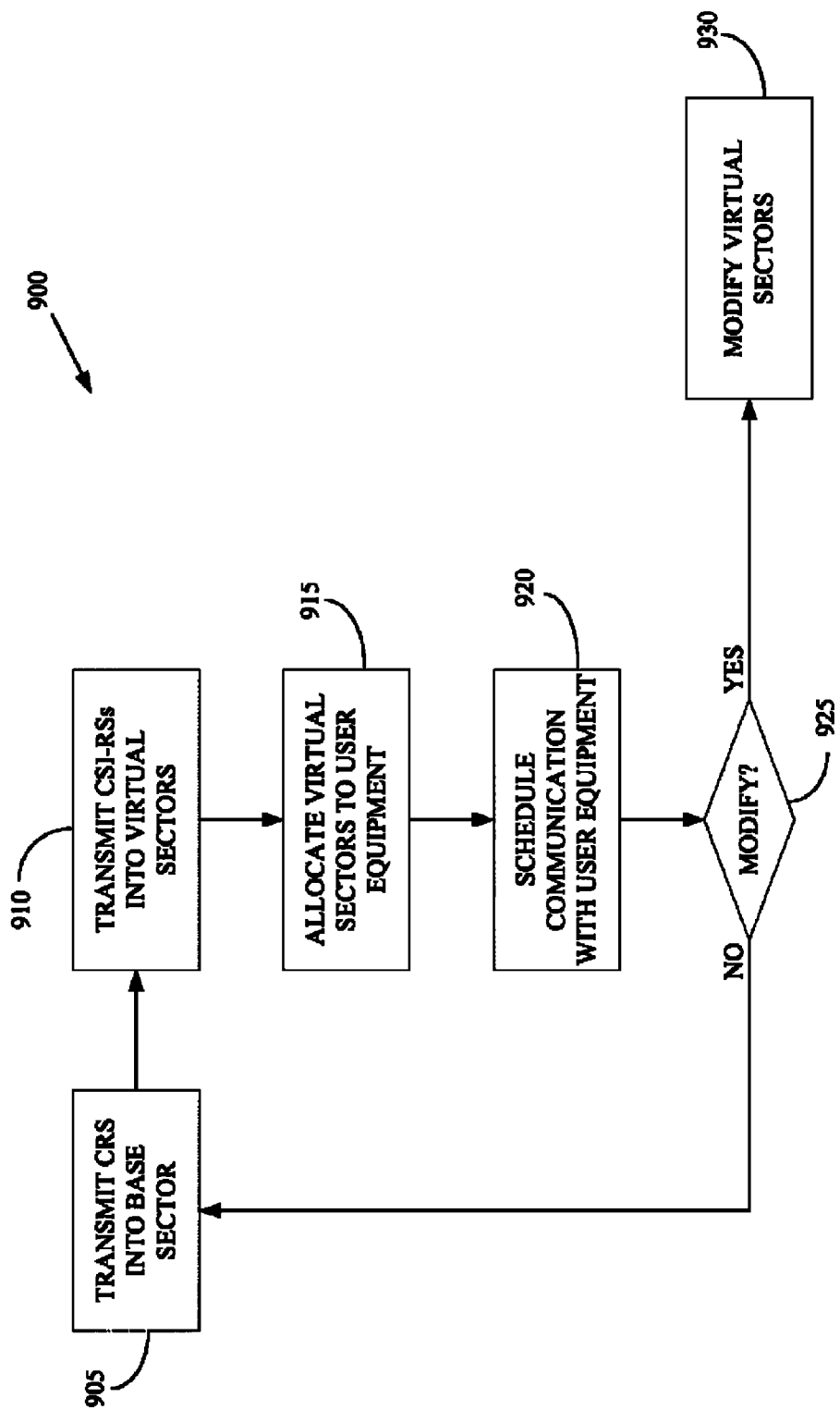
FIG. 9 conceptually illustrates one exemplary embodiment of a method of communicating with user equipment in virtual sectors.

FIG. 9 conceptually illustrates one exemplary embodiment of a method 900 of communicating with user equipment in virtual sectors. In the illustrated embodiment, a common reference signal is transmitted (at 905) by an active antenna array into a base sector that is associated with a sector identifier that may be used during handoffs to other base sectors. One or more virtual sectors may also be defined to overlap the base sector as discussed herein. Reference signals such as CSI-RSs may be transmitted (at 910) into the corresponding virtual sectors. Transmission (at 905, 910) of the base sector reference signals and the virtual sector reference signals may be simultaneous or concurrent. User equipment may then be allocated (at 915) to the virtual sectors. For example, estimates of the locations of user equipment may be compared to the coverage areas of the virtual sectors and the comparison may be used to allocate (at 915) user equipment to the virtual sectors that provide coverage to the location of the user equipment. The scheduler may be used to schedule (at 920) uplink or downlink communications with the user equipment.

The system may determine (at 925) whether to modify the number or distribution of the virtual sectors or the allocation of user equipment to the virtual sectors. In one embodiment, the system may determine (at 925) to modify the number or distribution of the virtual sectors based on changes in the distributions of user equipment, traffic loading criteria, traffic steering criteria, or other criteria. In another embodiment, which may be practiced in addition to or separately from the previous embodiment, the system may determine (at 925) to modify the allocation of user equipment to the virtual sectors in response to changes in the estimated locations of the user equipment, changes in the coverage areas of the virtual sectors caused by environmental changes or reconfiguration of the virtual sector, or other criteria. If the system decides (at 925) to modify the virtual sectors or the allocation of the user equipment, the modification may be performed (at 930). Otherwise, reference signals may continue to be transmitted (at 905, 910) to the base sector and virtual sectors.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
    a transmitter for providing signals to an active antenna array, wherein the signals cause the active antenna array to transmit a common reference signal (CRS) to a first sector indicated to user equipment within the first sector by a sector identifier, and wherein the signals cause the active antenna array to transmit a plurality of channel state information-reference signals (CSI-RSs) into a corresponding plurality of second virtual sectors that overlap the first sector; and
    a scheduler for scheduling transmission to user equipment based on feedback generated by the user equipment using at least one of the CRS or the CSI-RSs.

2. The apparatus of claim 1, wherein the plurality of second virtual sectors share the sector identifier with the first sector.

3. The apparatus of claim 1, comprising a location estimator for estimating locations of user equipment.

4. The apparatus of claim 3, wherein the scheduler is configured to allocate the user equipment to at least one of the first sector or the plurality of second virtual sectors based on the estimated locations of the user equipment.

5. The apparatus of claim 3, wherein the active antenna array transmits the plurality of CSI-RSs using a plurality of second beams, and wherein the scheduler is configured to allocate user equipment to one of the plurality of second beams based on the estimated locations of the user equipment.

6. The apparatus of claim 5, comprising a beamformer for modifying radiation patterns of the plurality of second beams.

7. The apparatus of claim 6, wherein the beamformer is configured to modify the radiation patterns of the plurality of second beams based on at least one of the estimated locations of the user equipment, the feedback generated by the user equipment, traffic load balancing, or traffic steering.

8. The apparatus of claim 5, wherein the CRS is conveyed by:
    at least one of the plurality of second beams; and
    a first beam transmitted by the active antenna array in response to signals provided by the transmitter.

9. The apparatus of claim 1, comprising a receiver for receiving uplink signals via the active antenna array, and wherein the scheduler is configurable to allocate user equipment to at least one third sector for transmission of the uplink signals.

10. The apparatus of claim 9, wherein said at least one third sector is different than the first sector and the plurality of second virtual sectors.

11. The apparatus of claim 1, comprising a quality control loop configured to apply a correction to feedback generated by legacy user equipment scheduled on one of the plurality of second virtual sectors while channel feedback is estimated from the CRS wherein the correction is determined based on different characteristics of the CRS and at least one of the plurality of CSI-RSs, and wherein the scheduler is configured to schedule transmission towards the legacy user equipment using the corrected feedback.

12. A base station, comprising:
an active antenna array;
a transceiver for transmitting downlink signals and receiving uplink signals via the active antenna array, wherein the downlink signals comprise a common reference signal (CRS) transmitted to a first sector indicated to user equipment within the first sector by a sector identifier and a plurality of channel state information reference signals (CSI-RSs) transmitted into a corresponding plurality of second virtual sectors that overlap the first sector; and
a scheduler for allocating user equipment to at least one of the first sector or the plurality of second virtual sectors based on feedback generated by the user equipment using at least one of the CRS or the CSI-RSs.

13. The base station of claim 12, wherein the plurality of second virtual sectors share the sector identifier with the first sector.

14. The base station of claim 12, comprising a location estimator for estimating locations of user equipment.

15. The base station of claim 14, wherein the scheduler is configured to allocate the user equipment to at least one of the first sector or the plurality of second virtual sectors based on the estimated locations of the user equipment.

16. The base station of claim 15, comprising a beamformer for modifying radiation patterns of the active antenna array, wherein the beamformer is configured to modify the radiation patterns based on at least one of the estimated locations of the user equipment, the feedback generated by the user equipment, traffic load balancing, or traffic steering.

17. The base station of claim 12, wherein the CRS is conveyed by a first beam or at least one of a plurality of second beams.

18. The base station of claim 12, wherein the scheduler is configurable to allocate user equipment to at least one third sector for reception of the uplink signals.

19. The base station of claim 18, wherein said at least one third sector is different than the first sector and the plurality of second virtual sectors.

20. The base station of claim 12, comprising a quality control loop configured to apply a correction to feedback generated by legacy user equipment based on different characteristics of the CRS and at least one of the plurality of CSI RSs, and wherein the scheduler is configured to schedule transmission towards the legacy user equipment using the corrected feedback.

21. A method, comprising:
providing signals to an active antenna array, wherein the signals cause the active antenna array to transmit a common reference signal (CRS) to a first sector indicated to user equipment within the first sector by a sector identifier, and wherein the signals cause the active antenna array to transmit a plurality of channel state information reference signals (CSI-RSs) into a corresponding plurality of second virtual sectors that overlap the first sector; and
scheduling transmission to user equipment based on feedback generated by the user equipment using at least one of the CRS or the CSI-RSs.

22. The method of claim 21, comprising estimating locations of the user equipment and allocating the user equipment to at least one of the first sector or the plurality of second virtual sectors based on the estimated locations of the user equipment.

23. The method of claim 21, comprising modifying radiation patterns of the active antenna array.

24. The method of claim 23, wherein modifying the radiation patterns comprises modifying the radiation patterns based on at least one of estimated locations of the user equipment, the feedback generated by the user equipment, traffic load balancing, or traffic steering.

25. The method of claim 23, wherein modifying the radiation patterns comprises modifying the radiation patterns and an antenna tilt to adjust a coverage area based on at least one of the estimated locations of the user equipment, the feedback generated by the user equipment, traffic load balancing, or traffic steering.

26. The method of claim 23, wherein modifying the radiation patterns comprises modifying the radiation patterns and at least one transmit power of at least one active element of the active antenna array to save power.

27. The method of claim 23, wherein modifying the radiation patterns comprises modifying the radiation patterns and at least one transmit power of at least one active element of the active antenna array based on at least one of estimated locations of the user equipment, the feedback generated by the user equipment, traffic load balancing, or traffic steering.

28. The method of claim 21, comprising allocating the user equipment to at least one third sector for reception of the uplink signals and receiving uplink signals from the user equipment via the active antenna array.

29. The method of claim 21, comprising applying a correction to feedback generated by legacy user equipment based on different characteristics of the CRS and at least one of the plurality of CSI-RSs and scheduling transmission towards the legacy user equipment using the corrected feedback.

30. The method of claim 21, wherein the plurality of second virtual sectors share the sector identifier with the first sector.

* * * * *